Patented Sept. 4, 1945

2,384,122

UNITED STATES PATENT OFFICE 2,384,122

UNSATURATED ESTER AND POLYMER THEREOF

Irving E. Muskat, Akron, and Franklin Strain, Norton Center, Ohio, assignors to Pittsburgh Plate Glass Company, Pittsburgh, Pa., a corporation of Pennsylvania No Drawing. Application December 27, 1941, Serial No. 424,668

11 Claims. (Cl. 260—78)

This invention relates to a new group of unsaturated esters, and to the polymers thereof. These new esters are the esters of (a) carbonic acid and (b) an ester of an unsaturated alcohol and a simple hydroxy polycarboxylic acid such as citric, malic, tartronic, oxalacetic, citromalic, hydroxy-phthalic acids, methyl ether of tartaric acid, and others containing two or more carboxylic groupings and a single hydroxyl group.

The esters are unsaturated containing molecular groups derived from unsaturated alcohols, particularly alcohols wherein the unsaturated group is in an aliphatic chain. This invention is particularly related to esters of unsaturated alcohols which contain up to five carbon atoms such as vinyl, allyl, methallyl, crotyl, isocrotyl, ethylallyl, propargyl, methylpropargyl, tiglyl, angelyl, butadienyl esters or esters of methyl vinyl carbinol, ethyl vinyl carbinol, dimethyl vinyl carbinol, methyl allyl carbinol and the halogen substituted products of the above alcohols. Esters of alcohols containing six to ten carbon atoms such as cinnamyl, diallyl carbinyl, phenyl-propargyl and isopropyl-propargyl alcohols, ethyl isobutenyl carbinol, linalool, 2,4-hexadienol-1, hexenol-1 and the halogen substituted products of the same may also be prepared.

The unsaturated carbonic esters may be prepared by reacting phosgene with hydroxy esters such as triallyl citrate, diallyl maleate, diallyl tartronate, diallyl oxalacetate, diallyl hydroxy-phthalate, diallyl citramalate, or the corresponding vinyl, methallyl, crotyl or other unsaturated alcohol esters or the mixed unsaturated esters such as diallyl crotyl citrate, allyl vinyl sodium citrate, allyl methallyl malate, allyl ricinoleyl malate, the mono allyl ether of diallyl tartrate, methallyl propargyl malate or the corresponding esters of the other hydroxy, polycarboxylic acids. The mixed alkyl-alkenyl or alkyl-alkinyl esters such as allyl methyl malate, allyl cetyl malate, methallyl ethyl malate, methallyl lauryl malate, vinyl heptyl malate, vinyl methyl malate, the mono methyl ether of diallyl tartrate, or the corresponding esters of other hydroxy polyacids may be similarly treated. Also, phosgene may be reacted with the acid esters, ester salts, or acid ester salts of the hydroxy polycarboxylic acid such as allyl, crotyl sodium citrate, allyl acid malate, vinyl sodium malate, allyl sodium malate, allyl potassium malate, calcium di(allyl malate), allyl calcium citrate, allyl methyl acid citrate, allyl sodium acid citrate or the corresponding unsaturated esters of other hydroxy polycarboxylic acids including the halogen, nitro or other substituted derivatives of the above acids wherein hydrogen is substituted with the halogen or other group.

A general formula of a group of unsaturated esters in which all acid groups of the hydroxy polycarboxylic acids are esterified with the same unsaturated alcohol may be written as follows:

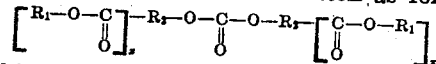

in which $R_1$ is the radical derived from the unsaturated alcohol and $R_2$ is the molecular residue of the hydroxy polycarboxylic acid having $x$ carboxylic groups esterified with unsaturated alcohol.

The hydroxy esters from which applicants' esters may be derived may be prepared by methods well known to the art, for example, by direct esterification of the acids, by inter-reaction of the salts of the acids with unsaturated hydrocarbon halides or by ester interchange methods. The vinyl esters may be prepared from acetylene by dehydrochlorination of $\beta$-chloro or $\beta$-bromo ethyl esters or by ester interchange from vinyl acetate.

The hydroxy esters are treated with phosgene at relatively low temperatures. Usually an ice bath, a dry ice-acetone mixture or other refrigeration medium is used to maintain a subnormal temperature. The preferred temperature is between 0° C. and 10° C. The reaction is preferably conduced in the presence of an alkaline agent. Pyridine, sodium, potassium, barium, calcium, strontium, or magnesium carbonate, bicarbonate, or hydroxide may be used for this purpose. Water or non-aqueous diluents such as acetone, benzene, or dioxane may be used to assist reaction. Polymerization inhibitors such as hydroquinone may be added to inhibit polymerization.

The esters thus prepared may be purified by usual means such as by distillation. In many cases, however, distillation is impractical in view of the high boiling points of the esters. Accordingly, the esters are generally purified by vaporization of low boiling diluents and by washing the reaction mixture with dilute acid and/or alkaline solutions and finally with water. The resulting product may be dried by usual dehydrating agents such as sodium sulphate or calcium chloride.

These new compounds polymerize in the presence of heat or light or other catalyst to yield solid or liquid compositions of widely differing physical properties. The polymerization is prefrably conducted in the presence of catalysts such as oxygen, ozone, or organic peroxides such as lauroyl, benzoyl, and acetone peroxides.

The products of polymerization vary greatly in their physical properties, depending upon the molecular structure of the monomer as well as upon the extent of polymerization. In general, the polymers are transparent and colorless and upon complete polymerization, a resin which is substantially insoluble and infusible at atmospheric pressure is produced. A range of resins from hard, brittle products to soft, flexible materials are secured. In the ultimate state the polymers are substantially unaffected by acids, alkalies, water, and organic solvents. Intermediate polymers having a wide range of properties may be secured. Upon the initial polymerization of liquid monomers or solutions of the monomers in suitable solvents, an increase in the viscosity of the liquid is noticeable due to the formation of a simple polymer which is soluble in the monomer and in solvents such as acetone, benzene, xylene, dioxane, toluene, or carbon tetrachloride. Upon further polymerization, the liquid sets up to form a soft gel containing substantial portions of polymers which are insoluble in the monomer and organic solvents and containing as well, a substantial portion of soluble material which may be monomer and/or soluble fusible polymer. These gels are soft and bend readily. However, they are fragile and crumble or tear under low stresses. They may be further polymerized in the presence of catalysts to the final infusible insoluble state in which substantially all of the polymer is substantially infusible and substantially insoluble in organic solvents, acids, and alkalies.

The monomers may be cast polymerized directly to the insoluble, infusible state. This procedure is subject to certain inherent difficulties due to the reduction in volume during the polymerization. The loss of volume or shrinkage causes strains to be established in the hardening gel which frequently result in fractures as the final hard form is attained. It has been discovered that these difficulties may be avoided by releasing the strains established in the gel. This may be done by interrupting the polymerization at an intermediate stage and permitting the strains to be relieved or by conducting polymerization under conditions which permit gradual release of these strains. For example, the polymerization may be conducted in a simple mold until a soft firm gel has formed. At this point the polymerization may be interrupted and the shaped polymer freed from the mold to which it adheres strongly. When released the polymer contracts substantially, thereby relieving the polymerization strains. The gel may thereafter be shaped, if desired, and polymerized to the final infusible state. Smooth, optically perfect sheets may be made by this method. Preferably, the initial polymerization is conducted at a temperature sufficiently low to prevent the decomposition of the peroxide catalyst. This temperature is dependent upon the catalyst used. For benzoyl peroxide temperatures of 65 to 80° C. are suitable while for acetone peroxide, temperatures of 140 to 150° C. may be used. The soft sheet of gel is then freed of the mold and in accordance with one modification, the gel may be coated on both sides with monomer or the syrupy polymer. The coated article is then polymerized between smooth heated plates to the final insoluble state.

In order to inhibit formation of cracks during the initial polymerization, it is frequently desirable to minimize the polymerization on one side of the sheet. This is done by conducting the polymerization with one side exposed to the air or other material which inhibits polymerization in the presence of a peroxide catalyst. Thus, a sheet is produced which is hard and smooth on one side while being soft and tacky on the other. The sheet may then be finished by coating the tacky side with monomer or syrupy polymer and polymerizing it in contact with a smooth plate to the insoluble infusible state. Often it is found desirable to release the polymer from the plate one or more times during polymerization of the coating in order to minimize formation of cracks or other surface defects. Further details of this process may be found in application for Letters Patent, Serial No. 392,111, filed May 6, 1941, by Vincent Meunier, and an application Serial No. 398,241, filed June 16, 1941, by Irving E. Muskat.

Other methods have been developed for polymerization of the compounds herein contemplated while avoiding formation of cracks and fractures. By one of these methods the polymerization may be suspended while the monomer-polymer mixture is in the liquid state and before the polymer is converted to a gel by cooling, removal from exposure to ultraviolet light, by adding inhibiting materials such as pyrogallol, hydroquinone, aniline, phenylene diamine, or sulphur, or by destruction of the polymerization catalyst. The fusible polymer may be separated from all or part of the monomer by any of several methods. It may be precipitated by the addition of nonsolvents for the fusible polymer such as water, ethyl alcohol, methyl alcohol, or glycol. Alternatively, it may also be separated from the monomer by distillation in the presence of an inhibitor for polymerization and preferably at reduced pressures. The fusible polymer is thus obtained in stable solid form and as such may be used as a molding powder or may be redissolved in suitable solvent for use in liquid form. It is soluble in organic solvents which are normally capable of dissolving methyl methacrylate polymer or similar vinyl type polymer. Preferably, the polymers are produced by heating the monomer or a solution thereof in the presence of 2 to 5 percent of benzoyl peroxide until the viscosity of the solution has increased about 100 to 500 percent. This may require several hours while heating at 65–85° C. in the presence of benzoyl peroxide. The resulting viscous solution is poured into an equal volume of water, methyl or ethyl alcohol, glycol, or other nonsolvent for the fusible polymer. A polymer usually in the form of a powder or a gummy precipitate is thus formed which may be filtered, decanted, or otherwise separated and dried. This permits substantially complete separation of a soluble fusible polymer from unpolymerized monomer.

Often, however, such complete separation may not be desirable since hazy products may be secured upon further polymerization. Accordingly, it is often desirable to produce compositions comprising the fusible polymer and the monomer. This may be effected by partial distillation or extraction of monomer from the polymer or by reblending a portion of the fusible polymer with the same or a different polymerizable monomer. In general, the composition should contain at least 40 percent and preferably in excess of 50 percent fusible polymer and from about 5 percent to 50 or 60 percent monomer.

Preferably, the production of these materials is conducted by treatment of a solution of the monomer in a solvent for monomer and polymer such as benzene, xylene, toluene, carbon tetrachloride, acetone, or other solvent which normally dissolves vinyl polymers.

Other polymerization methods may involve the interruption of the polymerization while the polymer is a gel. For example, a soft solid gel containing a substantial portion of fusible polymer may be digested with a quantity of solvent for the fusible polymer to extract the fusible gel from the infusible. The solution may then be used as molding or coating composition. Due to their solubility they are particularly desirable for use in paint compositions.

Other fusible polymers may be prepared by carrying the initial polymerization to the point where the polymer is in the form of a gel which generally contains at least 20 percent and preferably about 45 to 80 percent by weight of substantially insoluble polymer, but at which point the gel is still fusible. This solid resin composition may be disintegrated to a pulverulent form and used as a molding powder. Alternatively, a desirable polymer may be prepared by emulsifying the monomer or a syrupy polymer in an aqueous medium with or without a suitable emulsification agent such as polyvinyl alcohol, polyallyl alcohol, polymethallyl alcohol, etc., and then polymerizing to the point where the gel precipitates. This polymer may be separated and used as a molding powder.

The solid forms of the fusible polymers may be used as molding compositions to form desirable molded products which may be polymerized to a thermohardened state. Preferably, the molding is conducted in a manner such that the polymer fuses or blends together to form a substantially homogeneous product before the composition is polymerized to a substantially infusible state. This may be effected by conducting polymerization at an elevated temperature and/or pressure in the presence of 1 to 5 percent of benzoyl peroxide, generally in a heated mold. The polymers may be mixed with fillers such as alpha cellulose, wood pulp, and other fibrous substances, mineral fillers or pigments such as zinc oxide, calcium carbonate, lead chromate, magnesium carbonate, calcium silicate, etc.; plasticizers such as the saturated alcohol esters of phthalic acid, camphor, the saturated alcohol esters of maleic, fumaric, succinic, and adipic acids or di- or triethylene glycol bis (butyl carbonate). The polymeric molding powder may be copolymerized with phenolic, cellulose acetate, urea, vinylic, protein, or acrylic resins. It is thus possible to produce transparent or opaque forms of a wide variety of colors and hardnesses, depending upon the proper selection of the modifying agents.

The fusible polymers may be dissolved in suitable solvents and used as coating and impregnating compositions. For example, the solution of dispersion of fusible polymer in monomer or other organic solvent such as benzene, toluene, chloroform, acetone, dioxane, carbon tetrachloride, phenyl cellosolve, dichloroethyl ether, dibutyl phthalate, or mixtures thereof, may be useful as a liquid coating composition. Objects of paper, metal, wood, cloth, leather, or synthetic resins may be coated with the solution of polymer in solvent and subsequently polymerized to yield attractively finished coatings. Similarly, porous objects of felt, cloth, leather, paper, etc., either in single layers or laminated may be impregnated with the dissolved fusible polymer and subjected to the polymerization to the final insoluble infusible state.

The following examples are illustrative:

Example I

A quantity of 61 gms. of citric acid was esterified with 85 gms. of allyl alcohol in 200 cc. of benzene by refluxing for three hours. The excess alcohol was washed out with 200 cc. of water. The washed benzene solution was mixed with 100 g. of pyridine, cooled to +5° C. and a stream of phosgene bubbled through at the rate of about 20 millimoles per minute. In one-half hour the reaction was completed. During the reaction the temperature was maintained between +5 and +15° C. The excess phosgene was driven off by heating to 50° C. The benzene solution was washed with water and dried over sodium sulphate and the benzene was evaporated by heating in a vacuum whereby the ester bis (triallyl citrate) carbonate was formed. This ester is believed to have the structure:

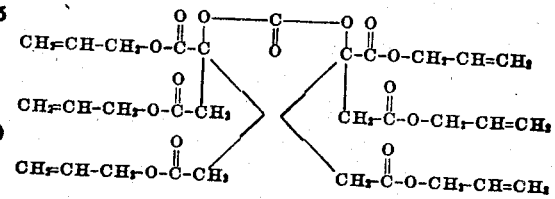

Example II 200 cc. of benzene, 67.3 g. of malic acid and 80 g. of methallyl alcohol (10% excess) were placed in a flask equipped with reflux condenser. The mixture was heated at the reflux temperature for four hours. The benzene condensate was separated from the water and returned to the reaction vessel. When no further water was evolved the reaction mass was cooled and washed with 200 cc. of water to remove the excess alcohol. The benzene solution was cooled to +2° C. in an ice bath, 100 cc. of pyridine was added and phosgene was bubbled through the reaction vessel until no further phosgene was absorbed. The solution was warmed gently to evolve the excess phosgene. The solution was heated under reduced pressure to separate the benzene from the unsaturated ester. This ester was a substantially colorless, high boiling liquid having the structure:

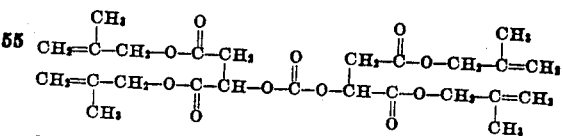

This ester polymerized to an insoluble gel upon heating in the presence of 5 percent benzoyl peroxide at a temperature of 70° C. for several hours.

Example III

One-half mole of tartronic acid (60 g.) was esterified with methallyl alcohol (72 g.) by refluxing the mixture in benzene. After five hours the unreacted materials were washed out with a small quantity of water. One and one-half moles of pyridine were added to the benzene solution and phosgene was bubbled through the reaction vessel at the rate of 20 millimoles per minute for one hour. The volatile impurities were removed by heating under reduced pressure and washing with water. The ester was polymerized by heating with 5% acetone peroxide at 160° C. to form a hard resinous product. The formula of the monomer was believed to be:

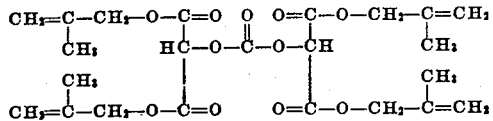

Example IV 20 grams of the ester of claim 1 was dissolved in 100 cc. benzene and mixed with 3 percent of benzoyl peroxide. The mixture was heated for 2 hours at which time a viscous liquid was obtained. The solution was poured into 500 cc. of methyl alcohol. A plastic mass was precipitated, recovered by decantation, and dried. The dried resin was placed in a mold and subjected to a temperature of 125° C. and a pressure of 200 pounds per square inch for one-half hour. A substantially insoluble infusible polymer was produced.

Example V

The ester described in Example II was polymerized to a soft gel by heating for one hour at 70° C. in the presence of 4 percent benzoyl peroxide. The soft gel was pulverized and mixed with 15 percent magnesium carbonate by means of a ball mill. The resultant powder containing a substantial quantity of residual peroxide was molded under a pressure of 200 pounds per square inch at 120° C., whereby the product was further polymerized and a glossy opaque product of uniform texture was produced.

Although the present invention has been described with reference to specific details of certain embodiments thereof, it is not intended that such details shall be regarded as limitations upon the scope of the invention except insofar as included in the accompanying claims. This application is a continuation-in-part of copending applications Serial No. 365,103, filed November 9, 1940, and Serial No. 361,280, filed October 15, 1940, by Irving E. Muskat and Franklin Strain.

We claim:

1. A neutral ester of (A) carbonic acid and (B) a monohydroxy ester of (a) a monohydroxy polycarboxylic acid and (b) a monohydric alcohol having unsaturation in an aliphatic straight chain of up to ten carbon atoms.
2. The compound of claim 1 in which the hydroxy polycarboxylic acid is citric acid.
3. The compound of claim 1 in which the hydroxy polycarboxylic acid is malic acid.
4. The compound of claim 1 in which the hydroxy polycarboxylic acid is tartronic acid.
5. Bis-(triallyl citrate) carbonate.
6. Bis-(dimethallyl malate) carbonate.
7. Bis-(dimethallyl tartronate) carbonate.
8. The polymer of the compound of claim 1.
9. The polymer of the compound of claim 5.
10. The polymer of the compound of claim 6.
11. The polymer of the compound of claim 7.

IRVING E. MUSKAT.
FRANKLIN STRAIN.